US012578627B2

(12) United States Patent
Nakamura

(10) Patent No.: US 12,578,627 B2
(45) Date of Patent: Mar. 17, 2026

(54) IMAGE PICKUP APPARATUS CAPABLE OF SUPPRESSING INCREASE IN SIZE OF IMAGE PICKUP APPARATUS DUE TO MOUNTING EXTERNAL CONNECTOR

(71) Applicant: CANON KABUSHIKI KAISHA, Tokyo (JP)

(72) Inventor: Hiroshi Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 204 days.

(21) Appl. No.: 18/604,919

(22) Filed: Mar. 14, 2024

(65) Prior Publication Data

US 2024/0345457 A1     Oct. 17, 2024

(30) Foreign Application Priority Data

Apr. 13, 2023     (JP) ................................. 2023-065579

(51) Int. Cl.
*G03B 17/02* (2021.01)
*G03B 17/04* (2021.01)

(52) U.S. Cl.
CPC .............. *G03B 17/02* (2013.01); *G03B 17/04* (2013.01); *G03B 2217/002* (2013.01)

(58) Field of Classification Search
CPC ...... G03B 17/02; G03B 17/04; G03B 17/561; G03B 2217/002; G03B 7/26; H04N 23/50; H04N 23/51
See application file for complete search history.

(56) References Cited

U.S. PATENT DOCUMENTS

2002/0025697 A1 *   2/2002  Suto ................... H01R 13/6595
                                                                          439/66

FOREIGN PATENT DOCUMENTS

JP          2002072321 A       3/2002
JP          2015008301 A  *    1/2015
JP          2015077045 A  *    4/2015

* cited by examiner

*Primary Examiner* — Stephanie E Bloss
*Assistant Examiner* — Fang-Chi Chang
(74) *Attorney, Agent, or Firm* — Cowan, Liebowitz & Latman, P.C.

(57)          ABSTRACT

An image pickup apparatus capable of avoiding an increase in the image pickup apparatus's size due to mounting an external connector is provided. The image pickup apparatus includes a barrel unit, a battery disposed in a second direction perpendicular to a first direction being an optical axis direction of the barrel unit, and a power supply circuit board on which an electronic component charging the battery is mounted. The power supply circuit board includes a first board portion disposed along a plane perpendicular to a third direction that is perpendicular to the first direction and the second direction, a second board portion disposed along a plane perpendicular to the first direction, and an external connector mounted on the second board portion with an insertion port into which an external terminal is inserted facing the third direction, and disposed within a length of the barrel unit in the first direction.

10 Claims, 8 Drawing Sheets

IMAGE PICKUP APPARATUS CAPABLE OF SUPPRESSING INCREASE IN SIZE OF IMAGE PICKUP APPARATUS DUE TO MOUNTING EXTERNAL CONNECTOR

BACKGROUND OF THE INVENTION

Field of the Invention

The present invention relates to an image pickup apparatus such as a digital camera.

Description of the Related Art

In an image pickup apparatus such as a digital camera that is equipped with an external connector for power supply (hereinafter, referred to as "an external power supply connector") for charging or supplying power from the outside, a position where the external power supply connector is disposed on a main body of the image pickup apparatus has a significant impact on the size of the image pickup apparatus. Therefore, for example, Japanese Laid-Open Patent Publication (kokai) No. 2002-72321 has disclosed an image pickup apparatus that enables miniaturization in a lateral direction of the image pickup apparatus by disposing a power supply board and a control board behind a lens unit (on the back surface side of the lens unit) with a main frame in between.

In the technique disclosed in Japanese Laid-Open Patent Publication (kokai) No. 2002-72321, by disposing a board on which the external power supply connector is mounted to overlap other components in an optical axis direction of the image pickup apparatus, an increase in the size of the image pickup apparatus in a direction perpendicular to the optical axis is suppressed. However, as a result, there is an issue that a dimension of the image pickup apparatus in the optical axis direction become significantly large.

SUMMARY OF THE INVENTION

The present invention provides an image pickup apparatus that is capable of avoiding an increase in a size of the image pickup apparatus in an optical axis direction due to mounting an external connector and is also capable of suppressing an increase in the size of the image pickup apparatus in a direction perpendicular to the optical axis.

Accordingly, the present invention provides an image pickup apparatus comprising a barrel unit, a battery disposed in a second direction perpendicular to a first direction that is an optical axis direction of the barrel unit with respect to the barrel unit, and a power supply circuit board on which an electronic component that charges the battery is mounted. The power supply circuit board comprises a first board portion disposed along a plane perpendicular to a third direction that is perpendicular to the first direction and the second direction, a second board portion disposed along a plane perpendicular to the first direction, and an external connector that is mounted on the second board portion with an insertion port into which an external terminal is inserted facing the third direction, and is disposed within a length of the barrel unit in the first direction. A position where a tip of the external terminal abuts when the external terminal is inserted into the external connector is provided so as to be closer to an optical axis of the barrel unit than a surface of the first board portion on which the electronic component is mounted in the third direction.

According to the present invention, it is possible to provide the image pickup apparatus that is capable of avoiding the increase in the size of the image pickup apparatus in the optical axis direction due to mounting the external connector and is also capable of suppressing the increase in the size of the image pickup apparatus in the direction perpendicular to the optical axis.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
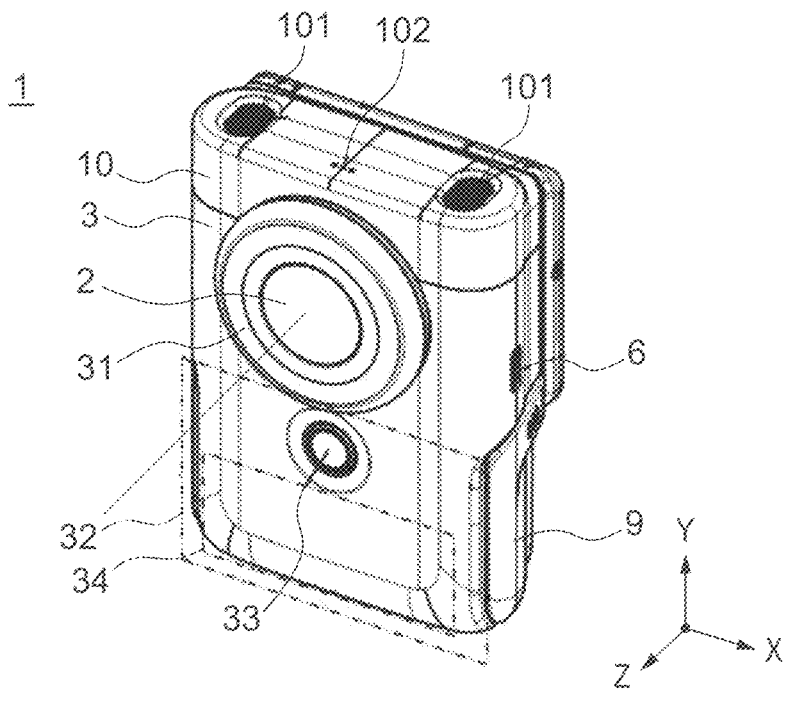
FIGS. 1A and 1B are perspective views showing an external appearance of an image pickup apparatus according to a preferred embodiment of the present invention.
Figure 1B:
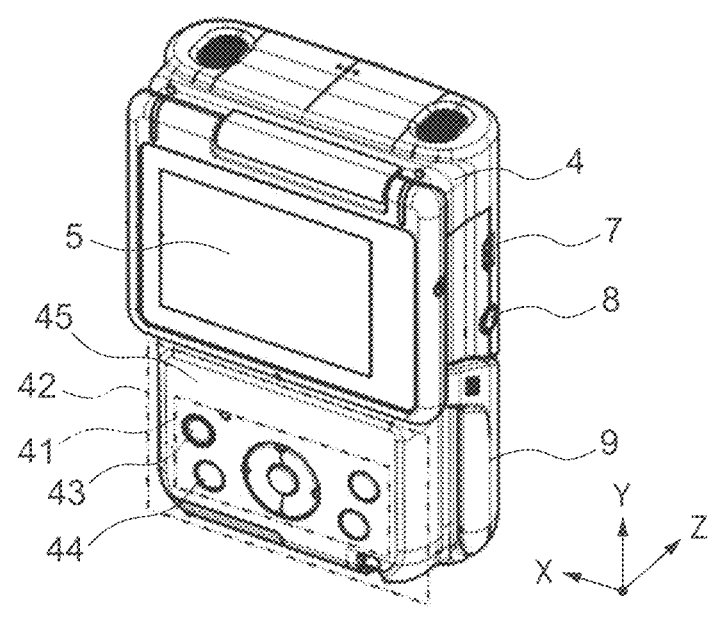
Figure 1C:
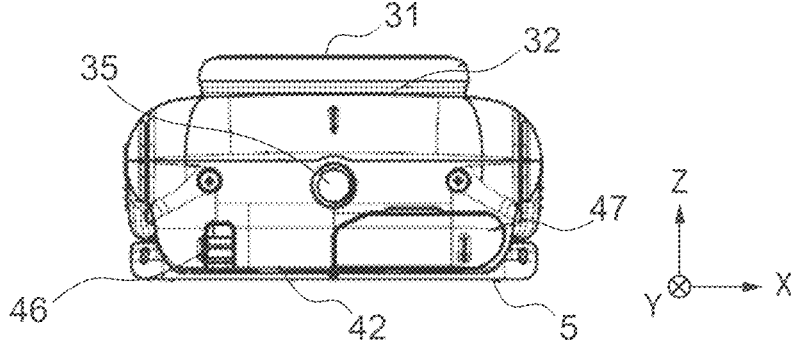
FIG. 1C is a bottom view showing the external appearance of the image pickup apparatus according to the preferred embodiment of the present invention.

Hereinafter, a preferred embodiment of the present invention will be described in detail with reference to the accompanying drawings. FIG. 1A is a front side perspective view of an image pickup apparatus 1 according to the preferred embodiment of the present invention (an external appearance perspective view when viewed obliquely from the front). FIG. 1B is a rear side perspective view of the image pickup apparatus 1 (an external appearance perspective view when viewed obliquely from the rear). FIG. 1C is a bottom view of the image pickup apparatus 1. For convenience of description, as shown in FIGS. 1A, 1B, and 1C, an X direction, a Y direction, and a Z direction that are perpendicular to each other with respect to the image pickup apparatus 1 are defined. Specifically, a thickness direction of the image pickup apparatus 1 is defined as the Z direction (a first direction), a top-and-bottom direction (a height direction) of the image pickup apparatus 1 is defined as the Y direction (a second direction), and a left-and-right direction (a width direction) of the image pickup apparatus 1 is defined as the X direction (a third direction).

A lens barrel unit 2 (hereinafter, referred to as "a barrel unit 2") including a photographing optical system is disposed on the front surface of the image pickup apparatus 1. The barrel unit 2 includes, for example, a fixed type single focus lens including a plurality of lenses, a shutter mechanism, a focus mechanism, etc. The barrel unit 2 is configured not to be extended even in the case that the power of the image pickup apparatus 1 is switched from an OFF state to an ON state. In addition, the barrel unit 2 includes an image pickup device (not shown) that photoelectrically converts an optical image of a subject formed by a plurality of photographing lenses (not shown) constituting the photographing optical system to generate image data.

It should be noted that in the image pickup apparatus 1, an optical axis direction of the barrel unit 2 is the Z direction. Further, the configuration of the barrel unit 2 itself may be a publicly known configuration as described above, and since it has no direct relation to the characteristic configuration of the present invention, a more detailed description will be omitted.

The external appearance of the front surface of the image pickup apparatus 1 is formed by a front surface cover 3. The outer periphery of the barrel unit 2 on the front surface cover 3 is a front surface ring 31 that protrudes one step toward the +Z side (forward). A front surface gripping portion 32 for a user to grip the image pickup apparatus 1 is provided on the −Y side (the lower side) of the front surface ring 31. By making the front surface ring 31 protrude more toward the +Z side than the front surface gripping portion 32 in the Z direction, when the user grips the image pickup apparatus 1, the user naturally comes to grip the front surface gripping portion 32 provided on the −Y side of the front surface ring 31. In other words, the front surface ring 31 serves as a mark when the user grips the image pickup apparatus 1, and is able to make it difficult for the user's hand gripping the image pickup apparatus 1 to enter a photographing view angle of the barrel unit 2.

A start/stop button 33 is disposed on the −Y side of the front surface ring 31 and on the +Y side (the upper side) of the front surface gripping portion 32. When the start/stop button 33 is pressed once, photographing starts, and when the start/stop button 33 is pressed again, photographing ends. An area on the −Y side of the start/stop button 33 in the front surface gripping portion 32 is a front surface finger rest space 34 on which the user places his or her fingers when gripping the image pickup apparatus 1.

Figure 2A:
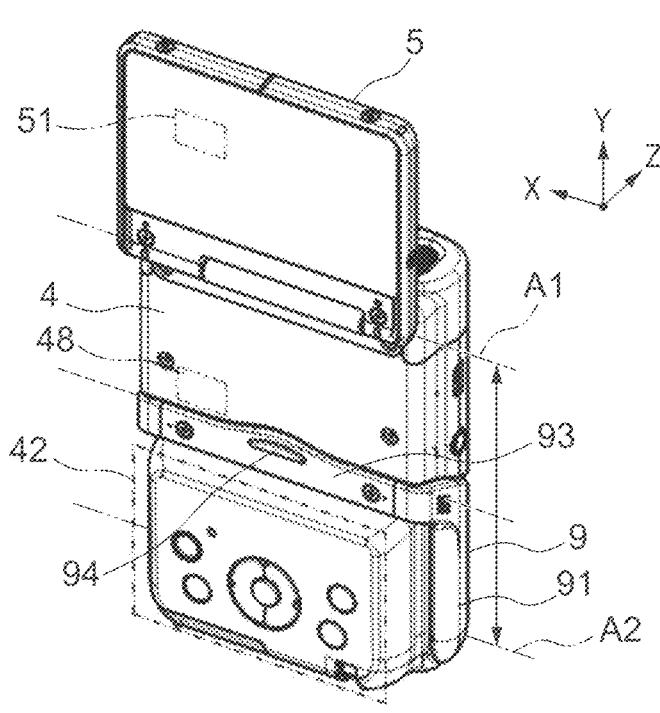
FIGS. 2A and 2B are perspective views showing the external appearance of the image pickup apparatus when a display unit and a stand are rotated.
Figure 2B:
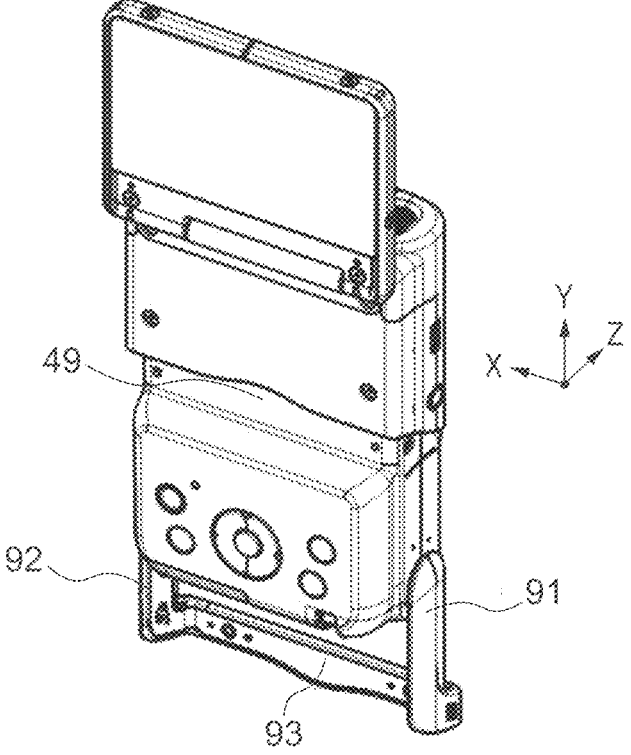

The external appearance of the back surface of the image pickup apparatus 1 is formed by a back surface cover 4 (see FIGS. 2A and 2B as appropriate). A display unit 5 such as a liquid crystal display device and a back surface operation portion 41 including a plurality of buttons are provided on the back surface of the image pickup apparatus 1. In the case that the power of the image pickup apparatus 1 is in the ON state and the image pickup apparatus 1 is set to a still image mode or a moving image mode, the display unit 5 displays a subject image (a through image) picked up (captured) by the image pickup device (not shown).

The display unit 5 is connected to a main body portion of the image pickup apparatus 1 (hereinafter, referred to as "an apparatus main body") by a display unit hinge (not shown). The display unit hinge has a rotation axis A1 (see FIGS. 2A and 2B) that is parallel to the X direction with respect to the image pickup apparatus 1, and allows the display unit 5 to rotate approximately 180 degrees around the rotation axis A1. A state shown in FIGS. 1A, 1B, and 1C is a state in which a rotation angle of the display unit 5 is 0 degree and the display unit 5 is housed on the back surface of the image pickup apparatus 1. It should be noted that FIGS. 2A and 2B show a state in which the rotation angle of the display unit 5 is approximately 180 degrees (hereinafter, referred to as "an open state"). By making the display unit 5 become the open state, when the user takes a selfie of himself/herself, the user is able to perform photographing while checking the composition on the display unit 5.

A back surface gripping portion 42 for the user to grip the image pickup apparatus 1 is provided on the −Y side of the display unit 5 so as to be one step lower than the display unit 5 in the +Z direction. It should be noted that the front surface gripping portion 32 and the back surface gripping portion 42 constitute a gripping portion of the image pickup apparatus 1.

Since the display unit 5 protrudes toward the −Z side with respect to the back surface gripping portion 42, when the user grips the image pickup apparatus 1, the user naturally comes to grip the image pickup apparatus 1 with the back surface gripping portion 42 located on the −Y side of the display unit 5. In other words, the display unit 5 serves as a mark when the user grips the image pickup apparatus 1, and is able to make it difficult for the user's hand to touch the display unit 5 when the user is gripping the image pickup apparatus 1.

The back surface operation portion 41 is provided on an area on the −Y side of the back surface gripping portion 42. The back surface operation portion 41 includes a power button 43 for switching the ON state/the OFF state of the power of the image pickup apparatus 1 (for turning on/off the power of the image pickup apparatus 1), and a playback button 44 that instructs playback of a photographed image that has been picked up (stored). When the playback button 44 is pressed, the photographed image is displayed on the display unit 5. Descriptions of buttons other than the power button 43 and the playback button 44 will be omitted.

A back surface finger rest area 45 on which the user places his or her thumb when the user is gripping the image pickup apparatus 1 is provided on an area on the +Y side of the back surface gripping portion 42. In the image pickup apparatus 1, on the back surface of the image pickup apparatus 1, the back surface finger rest area 45 is provided at a position facing the start/stop button 33 provided on the front surface of the image pickup apparatus 1. In addition, in the image pickup apparatus 1, on the front surface of the image pickup apparatus 1, the front surface finger rest space 34 is provided at a position facing the back surface operation portion 41. In this way, the user grips the image pickup apparatus 1 so as to sandwich it in the Z direction between the operating member to be operated and the finger rest space, thereby making it possible for the user to reliably press down the operating member (reliably perform the press-down operation of the operating member).

The external appearance of side surfaces (end surfaces in the X direction) of the image pickup apparatus 1 is formed by the front surface cover 3 and the back surface cover 4. Jacks for connecting to external devices (external equipment) such as an external connector for power supply 6 (hereinafter, referred to as "an external connector 6"), an HDMI (registered trademark) terminal 7, a microphone input terminal 8, etc., are disposed at alignment positions where the front surface cover 3 and the back surface cover 4 are aligned in the Z direction (a member abutment line D shown in FIG. 4A). These jacks are disposed on the +Y side than the front surface gripping portion 32 and the back surface gripping portion 42, that is, these jacks are disposed on an area that overlaps with the barrel unit 2 on a projection plane viewed from the X direction (an area A shown in FIG. 4B, which will be described below). Therefore, in the case that the user grips the image pickup apparatus 1 or places it on a desk or the like with the cable inserted into the jack to perform photographing, the user is able to perform photographing without the cable connected to the jack getting in the way. In this way, the usability of the image pickup apparatus 1 when using the cable is improved.

A stand 9 is provided on the side surfaces of the gripping portion (the front surface gripping portion 32 and the back surface gripping portion) of the image pickup apparatus 1. The stand 9 is connected to the apparatus main body by a stand hinge (not shown) having a rotation axis A2 (see FIGS. 2A and 2B) that is parallel to the X direction, and is rotatable around the rotation axis A2. For example, by using the stand 9 when placing the image pickup apparatus 1 on a predetermined structure to perform photographing, it becomes possible to perform photographing by placing the image pickup apparatus 1 tilted at a desired angle about the rotation axis A2. It should be noted that the stand 9 is defined as being in a housed state when substantially the entire stand 9 is in close contact with the apparatus main body as shown in FIGS. 1A, 1B, and 1C.

The external appearance of the top surface of the image pickup apparatus 1 is formed by a top surface cover 10. Microphone holes 101 for microphone are provided on the top surface of the top surface cover 10 that becomes the +Y side of the barrel unit 2 at positions that are symmetrical in the X direction across the X direction position of the optical axis of the barrel unit 2. In addition, speaker holes 102 for speaker for reproducing operation sounds and audio of a photographed moving image are provided at a substantially central portion of the top surface of the top surface cover 10 in the X direction at predetermined intervals in the X direction. By providing the microphone holes 101 on the top surface of the image pickup apparatus 1, it is possible to reduce a difference in sound collection performance when capturing sound coming from the front surface side of the image pickup apparatus 1 and sound coming from the back surface side of the image pickup apparatus 1.

The bottom surface of the image pickup apparatus 1 is provided with a tripod screw portion 35 for attaching an accessory such as a tripod, a strap attachment portion 46 for passing a strap string, and a medium cover 47. The medium cover 47 is attached to the apparatus main body so that it can be opened and closed. By opening the medium cover 47, it becomes possible to insert/remove a storage (not shown) such as an SD card, which is an external memory, into/from the apparatus main body.

Next, the operations of the display unit 5 and the stand 9 will be described. FIG. 2A is a rear side perspective view of the image pickup apparatus 1 with the display unit 5 in the open state and the stand 9 in the housed state. The display unit 5 is held in the apparatus main body so as to be rotatable around the rotation axis A1 located close to the top surface of the image pickup apparatus 1. A magnet 51 is disposed inside near the back surface of the display unit 5, and a yoke 48, which is a magnetic body, is disposed inside near the front surface of the back surface cover 4. The configuration, in which when the display unit 5 is rotated from the open state to the housed state, due to a mechanical suction force generated by the display unit hinge (not shown) and an attraction force generated by the magnet 51 and the yoke 48, the display unit 5 is biased in a housing direction at a predetermined angle and automatically transitions to the housed state, is adopted.

The stand 9 is held in the apparatus main body so as to be rotatable around the rotation axis A2 located close to the bottom surface of the image pickup apparatus 1. The stand 9 includes stand side surface portions 91 and 92 (leg portions) disposed on both side surfaces (both end surfaces in the X direction) of the image pickup apparatus 1. The stand side surface portions 91 and 92 are connected by a stand intermediate portion 93 (a connecting portion) extending in the X direction, so the stand 9 has a substantially U-shape, and the stand side surface portions 91 and 92 and the stand intermediate portion 93 rotate integrally.

Since the stand side surface portions 91 and 92 have substantially the same shape as the side surface shape of the front surface cover 3 and the back surface cover 4 when the stand 9 is in the housed state, the stand side surface portions 91 and 92 are configured so that they do not look strange and do not interfere with the user's gripping on the image pickup apparatus 1.

In order to reduce a collision noise between the display unit 5 and the stand 9 when the display unit 5 transitions from the open state to the housed state, a cushion member 94 is disposed in the stand intermediate portion 93. It should be noted that the stand 9 is constructed by attaching a resin cover as an exterior member, which forms the external appearance, to a substantially U-shaped metal member, but a detailed description of the structure of the stand 9 will be omitted.

FIG. 2B is a rear side perspective view of the image pickup apparatus 1 with the display unit 5 in the open state and the stand 9 rotated approximately 180 degrees from the housed state. In order to house the stand intermediate portion 93 when the stand 9 is in the housed state, a stand housing portion 49, which is hidden by the display unit 5 when the display unit 5 is in the housed state on the +Y side of the back surface gripping portion 42, is formed in the back surface cover 4. As described above, the rotation axis A1 of the display unit 5 and the stand rotation axis A2 of the stand 9 are each parallel to the X direction and disposed near end portions of the apparatus main body in the Y direction. In addition, the stand intermediate portion 93 is disposed approximately at the center of the rotation axis A1 and the rotation axis A2 in the Y direction.

When the stand 9 is rotated from the housed state while the display unit 5 remains in the housed state, the display unit 5 is pushed up by the stand intermediate portion 93. At this time, the point of action at which the display unit 5 is pushed up by the stand intermediate portion 93 becomes near the −Y side end portion of the display unit 5 when the display unit 5 is in the housed state with respect to the rotation axis A1 of the display unit 5. Therefore, the configuration is such that the force for rotating the stand 9 by the user does not become extremely large even when the force for pushing up the display unit 5 is applied. When the stand 9 is rotated to a predetermined angle, the stand intermediate portion 93 comes off from the back side of the display unit 5, and the display unit 5 is no longer pushed up by the stand 9. Then, the display unit 5 automatically returns to the housed state due to the suction force generated by the display unit hinge (not shown) and the attraction force generated by the magnet 51 and the yoke 48. In other words, in the case of being desired to use only the stand 9, there is no need to take the trouble to make the display unit 5 become the open state, thereby improving the usability of the stand 9.

Figure 3A:
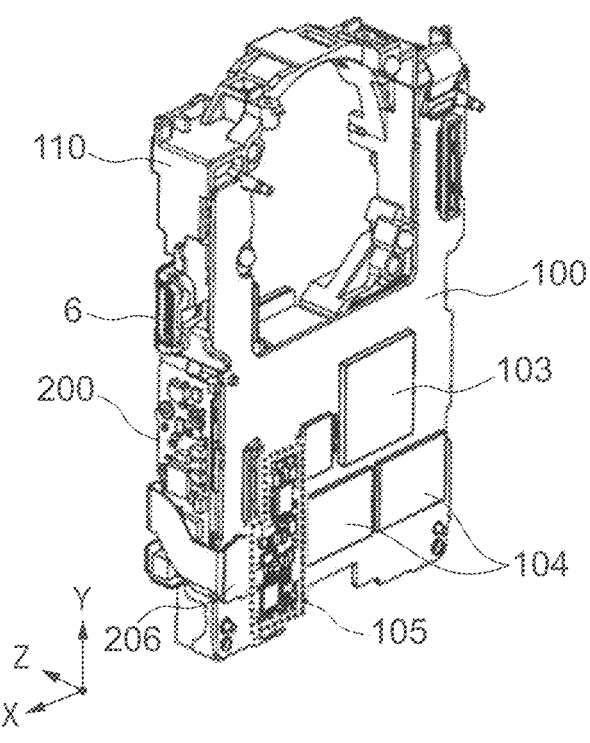
FIGS. 3A, 3B, and 3C are views showing a configuration of a main body unit of the image pickup apparatus.
Figure 3B:
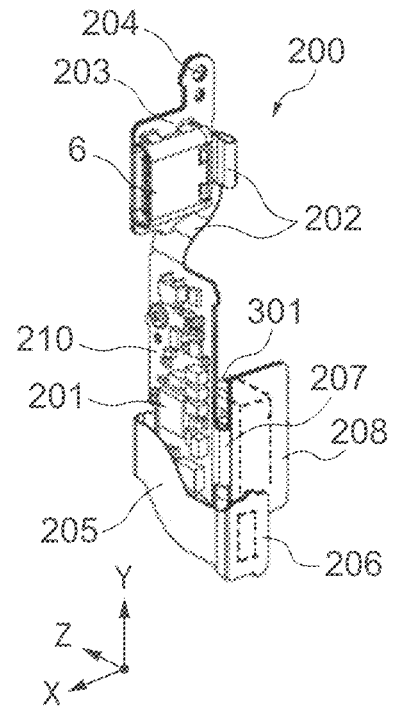
Figure 3C:
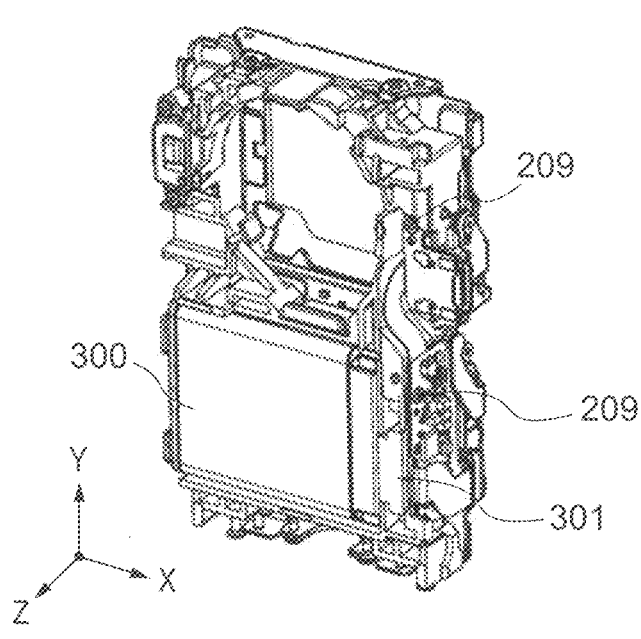

Next, the internal configuration (the internal structure) of the image pickup apparatus 1 will be described. FIG. 3A is a rear side perspective view of a main body unit of the image pickup apparatus 1. The image pickup apparatus 1 is configured by attaching the barrel unit 2, the front surface cover 3, the back surface cover 4, the display unit 5, the stand 9, etc., which are not shown in FIG. 3A, to the main body unit. FIG. 3B is a perspective view of a power supply circuit board 200 included in the main body unit. FIG. 3C is a front side perspective view of the main body unit of the image pickup apparatus 1.

The main body unit includes a main body chassis 110 serving as a substrate, and a main board 100 and the power supply circuit board 200 that are fastened to the main body chassis 110 with screws 209. The main body chassis 110 is molded by using, for example, polycarbonate resin. The main body chassis 110 becomes a structure capable of improving the mechanical strength of the image pickup apparatus 1 by fastening the front surface cover 3, the back surface cover 4, and the top surface cover 10 with screws. The main body chassis 110 is formed with an annular portion for holding the barrel unit 2 and a battery holding portion for housing and holding a battery 300. It should be noted that since FIG. 3C shows a state in which the battery 300 is housed in the battery holding portion, the shape of the battery holding portion itself is not shown in FIG. 3C.

The main board 100 is configured by a multilayer board, and has mounted an image processing engine 103, a memory 104, a power supply circuit 105, and a connection connector (not shown) for performing connection to the barrel unit 2, the power supply circuit board 200, etc.

The power supply circuit board 200 uses a flex-rigid board in which a plurality of hard board portions are connected by flexible arm portions (FPC portions). A charging control IC 201, which is an electronic component that charges the battery 300, is mounted on a first hard board portion 210, which is one of the plurality of hard board portions. A second hard board portion 203, which is one of the plurality of hard board portions, is connected to the first hard board portion 210 by a first flexible arm portion 202, and becomes a connector mounting portion on which the external connector 6 is mounted. The first flexible arm portion 202 extends from the +Z side of the side surface of the +Y side of the first hard board portion 210, that is, extends from the +Z side of the side surface of the first hard board portion 210 facing the external connector 6. In addition, an extending position of the first flexible arm portion 202 in the first hard board portion 210 is a position that does not overlap with the connector mounting portion (the external connector 6) in the Z direction. This makes it possible to dispose the connector mounting portion without being affected by the first flexible arm portion 202.

The second hard board portion 203 is fastened to the main body chassis 110 with the screw 209 by using a screw hole 204. In addition, a positioning hole is provided in the second hard board portion 203, and the arrangement position of the connector mounting portion having the second hard board portion 203 is regulated by fitting with a boss arranged on the main body chassis 110.

In the preferred embodiment of the present invention, although one USB connector (for example, one USB type-C connector) is mounted as the external connector 6 on one side of the second hard board portion 203, any one of connectors of other standards may be used as long as it can be used to supply power to the image pickup apparatus 1 or charge the battery. In addition, it is also possible to provide a plurality of connector mounting portions, and in this case, the first flexible arm portion 202 may be configured to extend from or be connected to one location of the first hard board portion 210, and to branch toward the plurality of connector mounting portions (the plurality of hard board portions) along the way.

One end of a second flexible arm portion 207 is connected to the first hard board portion 210, and the other end of the second flexible arm portion 207 is connected to a third hard board portion 208. A battery connector 301 is mounted on the third hard board portion 208, and a terminal portion (not shown) of the battery connector 301 is in contact with a terminal portion (not shown) disposed on the battery 300. As a result, the power is supplied from the battery 300 to the first hard board portion 210 via the third hard board portion 208 and the second flexible arm portion 207. In addition, one end of a third flexible arm portion 205 is connected to the first hard board portion 210, and the other end of the third flexible arm portion 205 is connected to a main board connection connector 206 mounted on the main board 100. In this way, the power is supplied from the battery 300 to the main board 100 via the power supply circuit board 200.

In this way, the power supply circuit board 200 has a circuit configuration that is able to distribute the power supplied from the battery 300 to a plurality of locations and use the power efficiently in a minimum space. It should be noted that in the preferred embodiment of the present invention, although the flex-rigid board is used in the power supply circuit board 200, a configuration may be adopted in which a plurality of hard boards and a plurality of flexible boards are used, and the plurality of hard boards are connected by using one flexible board or the plurality of flexible boards. In this case, the boards may be connected to each other by connectors, or by soldering, ACF bonding, or the like, and any method may be used. Moreover, the power supply circuit board 200 can also be configured by only flexible boards.

Figure 4A:
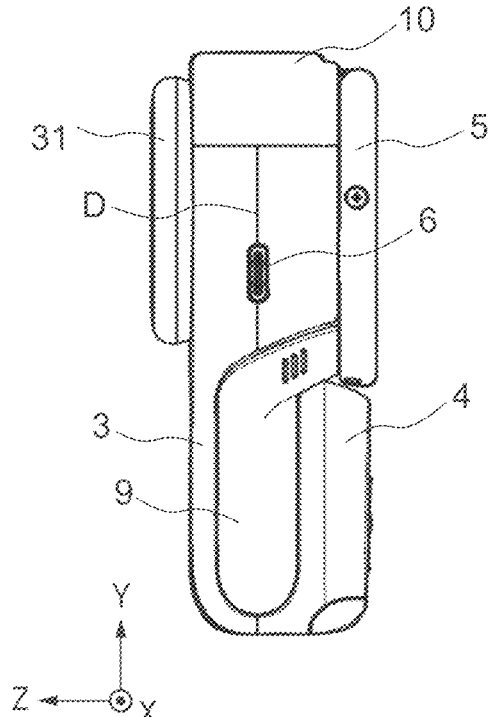
FIG. 4A is a side view showing the external appearance of the image pickup apparatus.
Figure 4B:
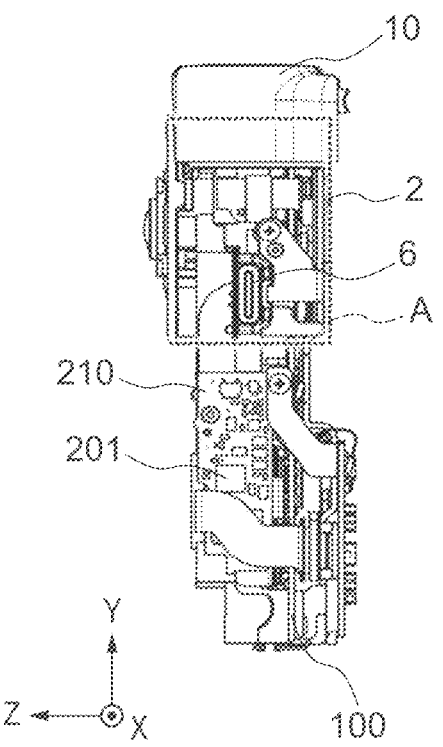
FIG. 4B is a side view showing the main body unit of the image pickup apparatus.

Next, the layout of the external connector 6 in the image pickup apparatus 1 will be described. FIG. 4A is a side view of the image pickup apparatus 1. FIG. 4B is a side view showing the internal structure (the main body unit) of the image pickup apparatus 1. The external connector 6 is disposed on the member abutment line D formed by the front surface cover 3 and the back surface cover 4 and within the area A where the barrel unit 2 exists on the projection plane viewed from the X direction. On the other hand, the first hard board portion 210 of the power supply circuit board 200 is disposed on the −Y side of the barrel unit 2 and at a position overlapping the area where the stand 9 exists in the housed state on the projection plane viewed from the X direction.

In this way, in the image pickup apparatus 1, on the projection plane viewed from the X direction, the external connector 6 is disposed in the area A of the barrel unit 2, and the first hard board portion 210 is disposed in the area of the stand 9. Thereby, the external connector 6 and the first hard board portion 210 do not become a bottleneck when determining the size of the image pickup apparatus 1 in the Z direction. Therefore, it becomes possible to efficiently dispose the external connector 6 and the first hard board portion 210 within the size in the Z direction (the Z-direction size) determined by other external appearance components.

It should be noted that the front surface cover 3 and the back surface cover 4 are formed into an R-curved surface so that the side surfaces (both end surfaces in the X direction) protrude outward, respectively, and the external connector 6 is provided on a ridgeline portion of the R-curved surface. Although the image pickup apparatus 1 has the configuration in which one external connector 6 is mounted on the front surface (one side) of the second hard board portion 203, if necessary, one or more external connectors may be mounted on each of both sides (the front surface and the back surface) of the second hard board portion 203. In this case, the second hard board portion 203 is disposed at a position overlapping the ridgeline portion of the side surface, which is formed by the front surface cover 3 and the back surface cover 4 in the shape of the R-curved surface, on the projection plane viewed from the X direction.

Figure 4C:
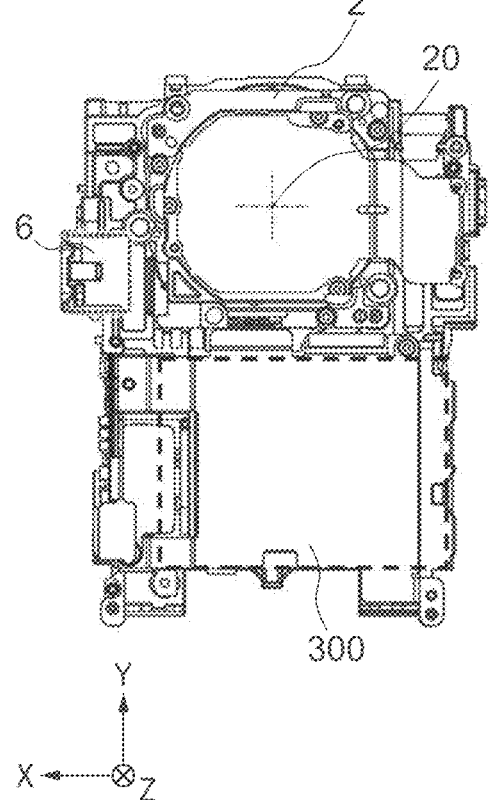
FIGS. 4C and 4D are cross-sectional views taken on a plane perpendicular to an optical axis of the image pickup apparatus.
Figure 4D:
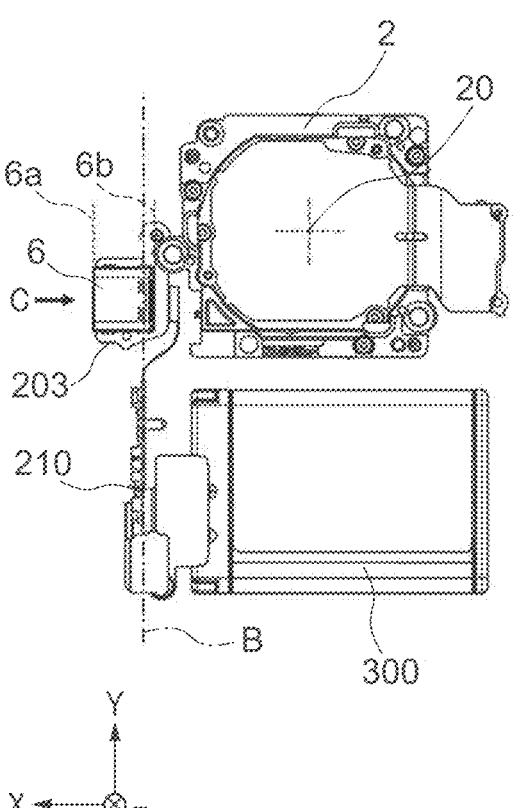

FIGS. 4C and 4D are cross-sectional views of the image pickup apparatus 1 on an XY plane perpendicular to the Z direction, and some parts (components) shown in FIG. 4C are omitted in FIG. 4D. As described above, the external connector 6 is disposed within the area occupied by the barrel unit 2 in the Y direction, but is disposed outside the area occupied by the barrel unit 2 in the X direction.

A direction (an insertion direction) in which an external terminal (a power supply connector (not shown)) is inserted into the external connector 6 is indicated by an arrow C. Here, in the insertion direction indicated by the arrow C, an insertion port end 6a and an abutment end 6b of the external connector 6 are defined. The insertion port end 6a appears on the external appearance of the image pickup apparatus 1. The external connector 6 is disposed so that the insertion port end 6a is located at approximately the same position as a ridgeline of the side surface, which is formed by the front surface cover 3 and the back surface cover 4 in the shape of the R-curved surface, on the projection plane viewed from the X direction.

The abutment end 6b is a surface on which, when a terminal that is compatible with the external connector 6 is inserted into the external connector 6, a tip of the terminal abuts. In the image pickup apparatus 1, the abutment end 6b is located at a position offset to the −X side (closer to the optical axis of the barrel unit 2 in the X direction) than a dashed-dotted line B indicating the position of the board surface of the first hard board portion 210 in the X direction. As a result, it is possible to avoid increasing the length of the image pickup apparatus 1 in the X direction (an increase in an X-direction dimension of the image pickup apparatus 1), and the external connector 6 can be laid out between the exterior surface (the external appearance surface) formed by exterior members (the front surface cover 3 and the back surface cover 4) and the barrel unit 2.

Figure 5:
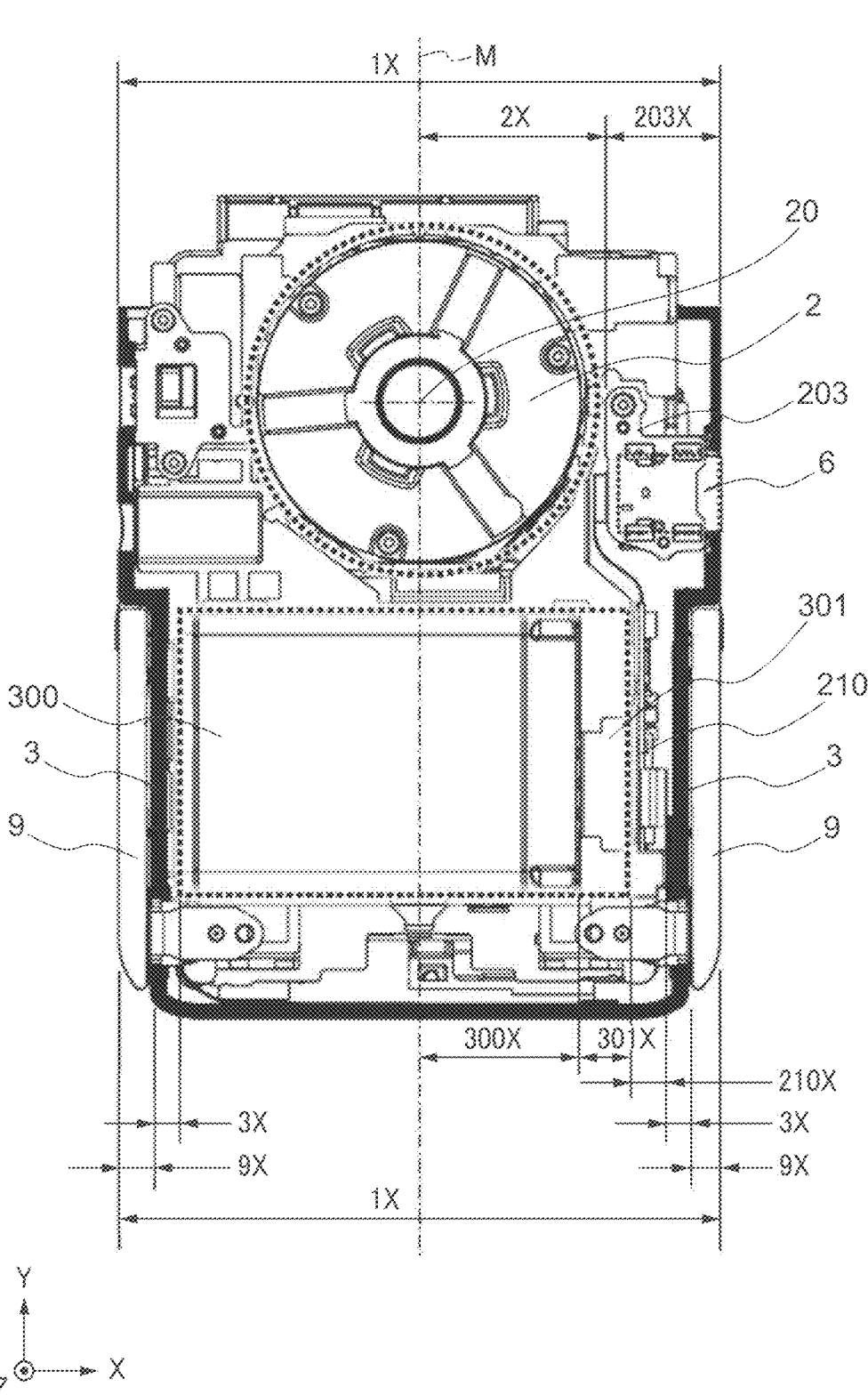
FIG. 5 is a view showing dimensions of respective parts (respective components) of the image pickup apparatus in a cross section perpendicular to the optical axis.

Next, the X-direction dimension (a width dimension) of the image pickup apparatus 1 will be described. FIG. 5 is a cross-sectional view of the image pickup apparatus 1 on the plane perpendicular to the Z direction. An area on the +X side where the external connector 6 is disposed when the image pickup apparatus 1 is divided in the X direction by a straight line M passing through an optical axis center 20 of the barrel unit 2 and parallel to the Y direction is referred to as "a right side area". In addition, an area on the +Y side where the barrel unit 2 is disposed in the image pickup apparatus 1 will be referred to as "an upper side area", and an area consisting of the front surface gripping portion 32 and the back surface gripping portion 42 on the −Y side of the barrel unit 2 will be referred to as "a lower side area".

The optical axis center 20 of the barrel unit 2 is located at the midpoint in the X direction in the upper side area. Therefore, in the upper side area of the image pickup apparatus 1, in the X direction, a length from the straight line M to the +X side end surface which is one side surface is equal to a length from the straight line M to the −X side end surface which is the other side surface.

In FIG. 5, "2X" is the X-direction dimension in the right side area including the barrel unit 2 and a clearance for its arrangement, and "203X" is the X-direction dimension of the connector mounting portion (the second hard board portion 203). Therefore, the X-direction dimension in the right side area of the upper side area of the image pickup apparatus 1 becomes "2X+203X", and the X-direction dimension of the entire upper side area of the image pickup apparatus 1 becomes "2(2X+203X)=1X".

Regarding the lower side area, "3X" is the X-direction dimension in the right side area including the front surface cover 3 and a clearance for its arrangement, "9X" is the X-direction dimension in the right side area including the stand 9 and a clearance for its arrangement, and "210X" is the X-direction dimension in the right side area including the first hard board portion 210 (including mounted components) and a clearance for its arrangement. "300X" is the X-direction dimension in the right side area of the battery 300. "301X" is the X-direction dimension of the battery connector 301. Therefore, the X-direction dimension in the right side area of the lower side area of the image pickup apparatus 1 becomes "300X+301X+210X+3X+9X".

Here, the lower side area is designed so that the straight line M, which passes through the optical axis center 20 of the barrel unit 2 and is parallel to the Y direction, passes through the midpoint of the stand 9 in the X direction. As a result, in the right side area of the image pickup apparatus 1, regarding the X-direction dimension, a relationship "the upper side area (2X+203X)=the lower side area (300X+301X+210X+3X+9X)" is established. As a result, "2(300X+301X+210X+3X+9X)", which is the X-direction dimension of the entire lower side area of the image pickup apparatus 1, is the same as "X1", which is the X-direction dimension of the entire upper side area of the image pickup apparatus 1.

In this way, in the image pickup apparatus 1, an exterior design (an external appearance design) with no unevenness in the X direction is achieved, and by disposing the external connector 6 in the upper side area and the first hard board portion 210 of the power supply circuit board 200 in the lower side area, it becomes possible to suppress an increase in the size of the entire image pickup apparatus 1. It should be noted that as long as the relationship "the X-direction dimension of the entire upper side area=the X-direction dimension of the entire lower side area" is established, the optical axis center 20 of the barrel unit 2 does not necessarily need to be located at the center of the upper side area in the X-direction, and the layout may be changed depending on the X-direction dimensions of various kinds of members.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-065579, filed on Apr. 13, 2023, which is hereby incorporated by reference herein in its entirety.

What is claimed is:

1. An image pickup apparatus comprising:

a barrel unit;

a battery disposed in a second direction perpendicular to a first direction that is an optical axis direction of the barrel unit with respect to the barrel unit; and a power supply circuit board on which an electronic component that charges the battery is mounted, and wherein the power supply circuit board comprises a first board portion disposed along a plane perpendicular to a third direction that is perpendicular to the first direction and the second direction;

a second board portion disposed along a plane perpendicular to the first direction; and an external connector that is mounted on the second board portion with an insertion port into which an external terminal is inserted facing the third direction, and is disposed within a length of the barrel unit in the first direction, and a position where a tip of the external terminal abuts when the external terminal is inserted into the external connector is provided so as to be closer to an optical axis of the barrel unit than a surface of the first board portion on which the electronic component is mounted in the third direction.

2. The image pickup apparatus according to claim 1, further comprising:

a stand that has a rotation axis parallel to the third direction and includes leg portions on both end surfaces of the image pickup apparatus in the third direction, and wherein the first board portion is disposed between one of the leg portions of the stand and the battery in the third direction, and the external connector is disposed at a position that does not overlap with the stand and the battery on a projection plane viewed from the third direction.

3. The image pickup apparatus according to claim 1, further comprising:

two covers that form an external appearance of the image pickup apparatus by sandwiching a main body portion of the image pickup apparatus in the first direction, and wherein the external connector is disposed on an abutment line formed by the two covers and at a position that overlaps with the barrel unit on a projection plane viewed from the third direction.

4. The image pickup apparatus according to claim 3, wherein the two covers are formed into an R-curved surface having a ridgeline in the second direction so that both end surfaces in the third direction protrude outward, respectively, and the external connector is provided on a ridgeline portion of the R-curved surface on the projection plane viewed from the third direction.

5. The image pickup apparatus according to claim 4, wherein in the external connector, an insertion port end, into which the external terminal is inserted, is located at approximately the same position as the ridgeline of the R-curved surface on a projection plane viewed from the first direction.

6. The image pickup apparatus according to claim 1, further comprising:

at least one jack used for connection to external devices, and wherein on a projection plane viewed from the third direction, the jack is disposed in an area that overlaps with the barrel unit.

7. The image pickup apparatus according to claim 1, further comprising:

two covers that form an external appearance of the image pickup apparatus by sandwiching a main body portion of the image pickup apparatus in the first direction, and wherein one or more external connectors are mounted on each of a front surface and a back surface of the second board portion, and the second board portion is disposed on an abutment line formed by the two covers and at a position that overlaps with the barrel unit on a projection plane viewed from the third direction.

8. The image pickup apparatus according to claim 1, further comprising:

a flexible arm portion that connects the first board portion and the second board portion, and wherein the flexible arm portion extends from a side surface of the first board portion facing the external connector in the second direction, and an extending position of the flexible arm portion in the first board portion does not overlap with the external connector and the second board portion in the first direction.

9. The image pickup apparatus according to claim 8, wherein the first board portion and the second board portion are hard board portions, and the power supply circuit board is a flex-rigid board in which the first board portion and the second board portion are connected by the flexible arm portion.

10. The image pickup apparatus according to claim 1, wherein the external connector is a USB connector.

* * * * *